United States Patent [19]

Stahl

[11] 4,061,349

[45] Dec. 6, 1977

[54] AUXILIARY WHEEL ASSEMBLY

[76] Inventor: Roy Layton Stahl, 6838 Forest Crest North, San Antonio, Tex. 78240

[21] Appl. No.: 750,012

[22] Filed: Dec. 13, 1976

[51] Int. Cl.² .............................................. B62B 1/20
[52] U.S. Cl. ............................... 280/47.2; 280/476 R
[58] Field of Search ................ 280/47.2, 47.21, 47.3, 280/47.31, 767, 763, 476 R

[56] References Cited

U.S. PATENT DOCUMENTS

| 1,255,128 | 2/1918 | Bayley | 280/47.2 |
| 1,735,527 | 11/1929 | Civik | 280/47.31 |
| 2,784,985 | 3/1957 | Schnell | 280/763 |
| 3,146,002 | 8/1964 | Faber | 280/763 |

FOREIGN PATENT DOCUMENTS 459,900  6/1913  France ............................. 280/47.31

Primary Examiner—Robert R. Song
Assistant Examiner—R. Schrecengost
Attorney, Agent, or Firm—John C. Stahl

[57] ABSTRACT

An auxiliary wheel assembly mounted on a selected portion of a wheelbarrow including a wheel adapted to be pivoted forwardly and secured in elevated condition when out of operative position, said wheel adapted to be pivoted rearwardly and support the rear portion of said wheelbarrow in operative position, and means to secure said wheel in elevated condition in a rearward position.

11 Claims, 8 Drawing Figures

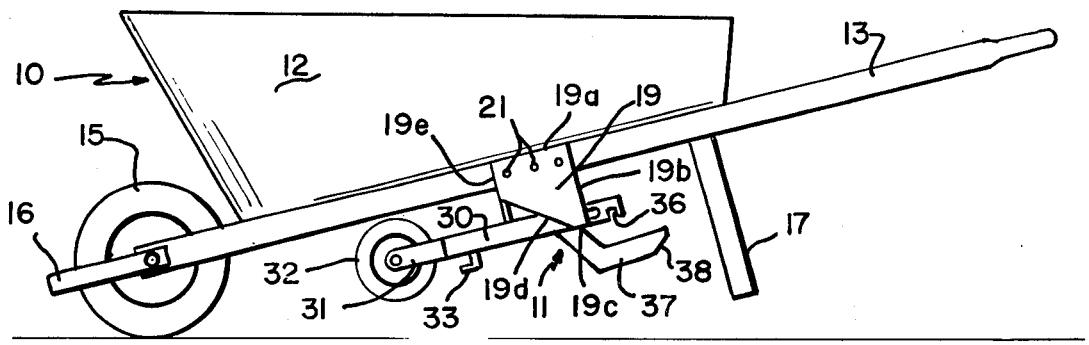
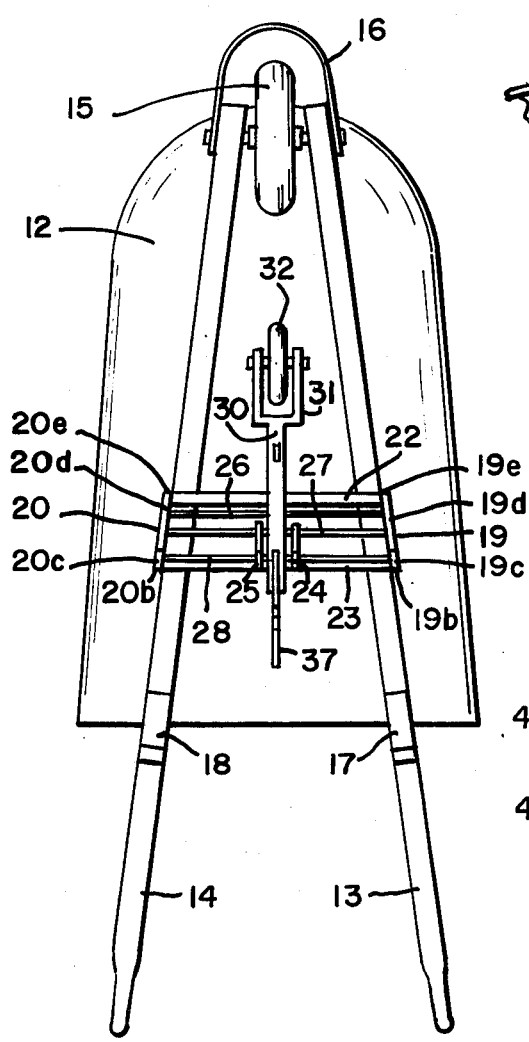
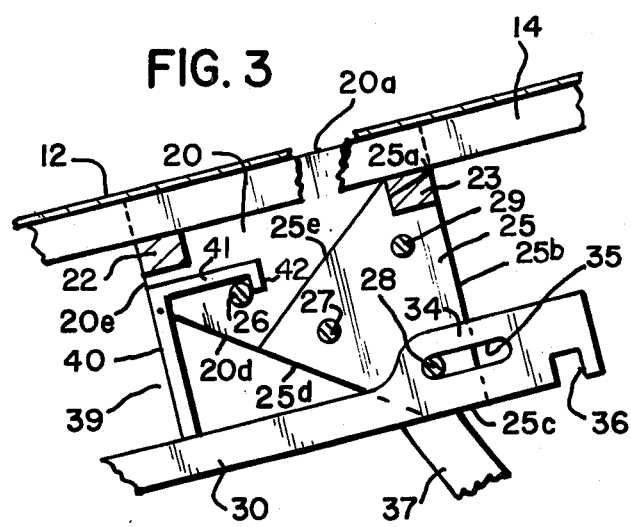
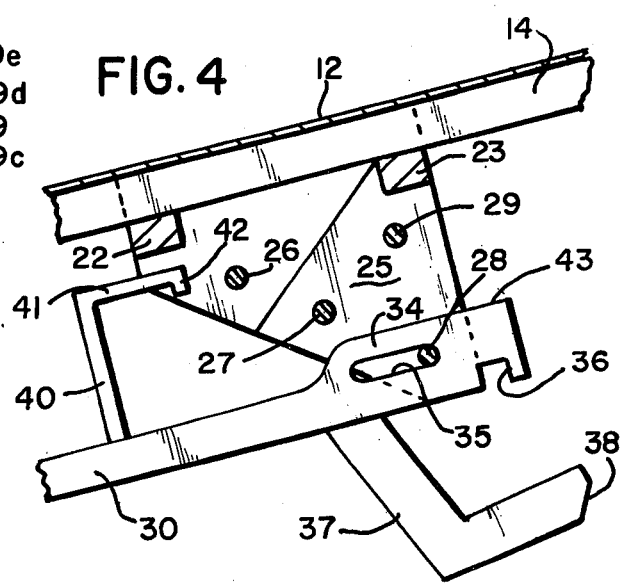

AUXILIARY WHEEL ASSEMBLY

BACKGROUND OF THE INVENTION

Wheelbarrows including an auxiliary rear wheel in addition to the ordinary front wheel to relieve the operator of a portion of the load are well known in the art. In many of these embodiments it is often necessary to use both hands to effect such adjustment. Additionally, in several of such embodiments the rear wheel is not secured in an elevated position and when the rear end of said wheelbarrow is raised to clear obstacles, turn corners and the like said rear wheel may disadvantageously pivot forwardly.

SUMMARY OF THE INVENTION

The principal object of the invention is to provide an auxiliary wheel assembly for wheelbarrows which may easily be placed into and out of operative position.

Another object is to provide such an assembly which does not interfere with the normal operation of the wheelbarrow.

Still another object is to provide such an assembly which is of simple yet rugged construction, requires little or no maintenance or repairs over extended periods of use, and is universal in its adaptability.

Other objects and features of the invention will become apparent to those skilled in the art from a consideration of the following specification when read in the light of the annexed drawings.

BRIEF DESCRIPTION OF THE DRAWINGS

FIG. 1 is a side elevational view of a wheelbarrow with the rear end raised and the auxiliary wheel assembly of the subject invention mounted thereon in out of operative position.

FIG. 2 is a bottom plan view of FIG. 1.

FIG. 3 is a fragmentary, logitudinal, greatly enlarged vertical sectional view showing the medial portion of the auxiliary wheel assembly in out of operative position.

FIG. 4 is a fragmentary, longitudinal, greatly enlarged vertical sectional view showing the medial portion of the auxiliary wheel assembly immediately prior to rearward movement.

DESCRIPTION OF PREFERRED EMBODIMENTS

Figure 5:
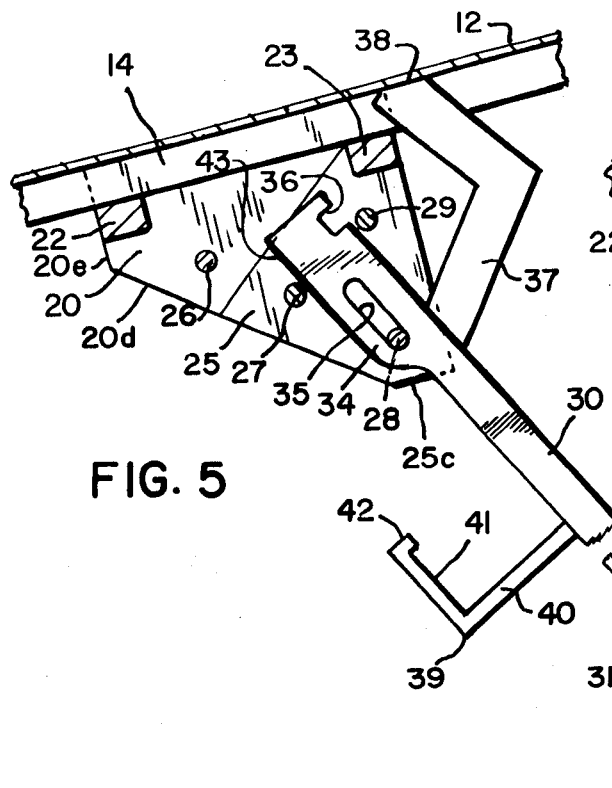
FIG. 5 is a fragmentary, longitudinal, greatly enlarged vertical sectional view showing the auxiliary wheel assembly pivoted rearwardly and elevating the rear of the wheelbarrow.
Figure 6:
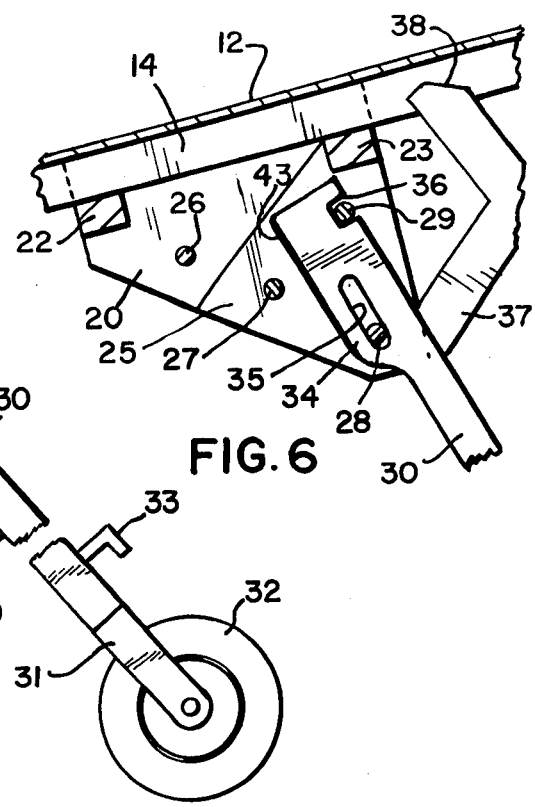
FIG. 6 is a fragmentary, longitudinal, greatly enlarged vertical sectional view showing the auxiliary wheel assembly secured in an elevated position.

Referring now to the drawings, wherein like reference characters designate like or corresponding parts throughout the several views, there is shown in FIGS. 1-6 a wheelbarrow 10 including auxiliary wheel assembly 11 of the subject invention. It is to be understood that said auxiliary wheel assembly may be attached to any wheelbarrow of conventional construction or a wheelbarrow constructed in accordance with such principles.

In general, wheelbarrow 10 consists of pan 12 of desired shape, size and composition with forwardly converging handles 13-14 of desired composition fixedly secured to selected parts of the bottom of said pan. Wheel 15 is rotatably mounted intermediate the foremost ends of said handles at least slightly forwardly of said pan; desirably a U-shaped wheel guard 16 or the like is secured rearwardly to the foremost ends of said handles and passes at least slightly forwardly of said wheel. Depending legs 17-18 of desired length, configuration and composition are transversely aligned and conventionally secured upwardly to the respective handles in proximity to the rear end of said pan; if desired, cross bracing or the like may be provided between said legs and/or each leg and its respective handle.

Auxiliary wheel assembly 11 is mounted on selected portions of handles 13, 14 intermediate wheel 15 and legs 17, 18. More specifically, assembly 11 terminates laterally in coacting, vertically extending, pentagonally shaped plates 19-20 which are transversely aligned and adapted to be fixedly secured to the outer sides of said handles. For purposes of convenience only, plate 19 will be described in detail; it is understood that plate 20 is of similar shape and size and connected to the outer side of handle 14. Plate 19 is bounded by top edge 19a, perpendicularly extending rear edge 19b, relatively short bottom edge 19c paralleling top edge 19a, angularly inclined lower front edge 19d, and upper front edge 19e paralleling rear edge 19b. The top edges 19a, 20a of said plates normally butt the bottom of pan 12 and fastening means 21 passed through the upper portions thereof into the respective handles. Transversely extending and longitudinally spaced rectangular bars 22-23 are adapted to be secured laterally to the bottom of said handles. The front side of bar 22 is aligned with front edges 19e, 20e of said plates while the rear side of bar 23 is aligned with rear edges 19b, 20b thereof; desirably said bars are additionally secured laterally to the corresponding portions of plates 19, 20.

Longitudinally and vertically extending polygonally shaped plates 24-25 are mounted a desired distance laterally of the medial plane of the wheelbarrow intermediate plates 19, 20. For purposes of convenience only, plate 25 will be described in detail; plate 24 is of similar shape and size. Plate 25 terminates upwardly in recess 25a conforming to the foremost side and bottom of bar 23 and said plate is fixedly secured thereto; rear edge 25b of plate 25 is aligned with rear edges 19b, 20b; bottom edge 25c is aligned with and corresponds in length to bottom edges 19c, 20c; lower inclined edge 25d is aligned with lower front edges 19d, 20d; and upper and rearwardly inclined edge 25e begins at least slightly above the midpoint of edges 19d, 20d and terminates upwardly at the foremost, top surface of bar 23.

As best seen in FIGS. 2 and 3, transversely and horizontally extending rods 26-29 are secured to selected parts of plates 19, 20, 24 and 25, respectively. In general, rods 26-28 lie in the same approximate rearwardly declining plane approximately paralleling edges 19d, 20d; rod 26 is spaced a desired distance below the plane of the bottom of bar 22 and is fixedly secured laterally to plates 19, 20; bar 27 passes through a bore (not shown) provided in the interior angle formed between edges 25d, 25e of plate 25, an aligned bore in the corresponding portion of plate 24, and secured laterally to plates 19, 20. Rod 28 passes through a bore (not shown) in proximity to the interior angle formed between edges 25b, 25c of plate 25, an aligned bore in the corresponding portion of plate 24, and the remote ends of said bar secured to plates 19, 20. Rod 29 is positioned a desired distance vertically below bar 23 and approximately horizontally aligned with rod 26 and vertically aligned with rod 28; said rod 29 passes through aligned bores in plates 24, 25 and is fixedly secured laterally to plates 19, 20. Those portions of rods 27-29 passing through selected portions of plates 24, 25 are desirably fixedly secured therein for structural strength.

Medially and longitudinally extending leg 30 of metallic composition terminates forwardly in yoke 31 with wheel 32 rotatably mounted therein; a depending, rearwardly opening L-shaped bracket 33 is secured to the bottom of said leg rearwardly of said yoke. The rearmost portion of leg 30 includes integrally formed section 34 of uniform, greater height with an elongated, laterally opening slot 35 of desired length therethrough; section 34 of said leg is adapted to pass intermediate plates 24, 25 in a relatively close fit with rod 28 carried in slot 35. As will hereinafter be more fully described in connection with FIG. 5, rods 27, 29 are angularly displaced a distance at least slightly greater than the corresponding vertical height through section 34 whereby said section may pass angularly upwardly therethrough in one position of said leg. Transversely extending, upwardly opening slot 36 is provided in the lower, rearmost portion of section 34. An essentially V-shaped member 37, fixedly secured at one end to the rearmost portion of said leg at least slightly forwardly of slot 36, extends substantially below the plane of the bottom of said leg, and terminates substantially rearwardly of said leg in angularly inclined surface 38 which may bear against the bottom of pan 12 in operative position of said leg.

Bracket 39, secured to the top of leg 30 intermediate yoke 31 and section 34, includes vertical section 40, perpendicularly rearwardly extending section 41 of desired length, and relatively short, downturned flange 42. As illustrated in FIGS. 1 and 3 of the drawings, in the out of operative position of leg 30, section 41 of bracket 39 overlies rod 26 and flange 42 secures said leg essentially parallel to the handles. To use the auxiliary wheel, the operator exerts an upward force on handles 13, 14 and applies a downward and forward force to the rearmost end of member 37 by means of either foot whereby section 41 of said bracket is forced upwardly and forwardly, clearing rod 26. At such time that rod 28 bears against the rear edge of slot 35, the weight of wheel 32 causes said leg to swing downwardly and rearwardly past the vertical plane extending through said wheel assembly in such raised condition. Upon lowering said wheelbarrow, wheel 32 bears against the ground or other supporting surface and rolls rearwardly; the opposing upper end of said leg rotates forwardly until stopped by the flat upper surface 43 of section 34 bearing against rod 27. Upon lowering the wheelbarrow section 34 passes angularly upwardly between rods 27, 29 until stopped by rod 28 bearing against the lower end of slot 35 at which time wheel 32 additionally supports the load in said wheelbarrow and the lower end of legs 17, 18 are above ground level. Inclined surface 38 of member 37 may bear against the bottom of pan 12 in such operative position to provide further support for leg 30.

To change the auxiliary wheel from the operative position illustrated in FIG. 5 to the out of operative position of FIG. 3, the operator exerts a forward and then upward force on the handles, places either foot on bracket 33 forcing the same forwardly of the vertical plane extending through the said auxiliary wheel assembly, and then applies a force on the end of member 37 causing bracket 39 to pivot upwardly and then rearwardly to engage rod 26.

When turning the wheelbarrow around corners, sharp angles and at other times it is often desirable to secure said wheel in an elevated position to permit such operation. As viewed in FIG. 6 of the drawings, leg 30 may be secured in raised, inclined condition when slot 36 in said leg engages rod 29. With the leg 30 in the position illustrated in FIG. 5, the operator places either foot on bracket 33, exerts a rearward and then upward force on handles 13, 14 whereby slot 36 in said leg engages rod 29. To release leg 30 from such secured, elevated condition the operator merely lowers the handles until wheel 32 bears against the ground or other supporting surface and rolls rearwardly. At such time slot 36 is disengaged from rod 29 and the said arm then moves angularly upwardly into the operative position of FIG. 5 or may be moved to the out of operative position illustrated in FIG. 3 in the manner heretofore described.

In a modification of the embodiment of FIGS. 1-6, rod 26 is removed and a medial, longitudinally extending and downwardly depending bracket is secured to the bottom of bar 22 to receive section 41 of bracket 39.

Figure 7:
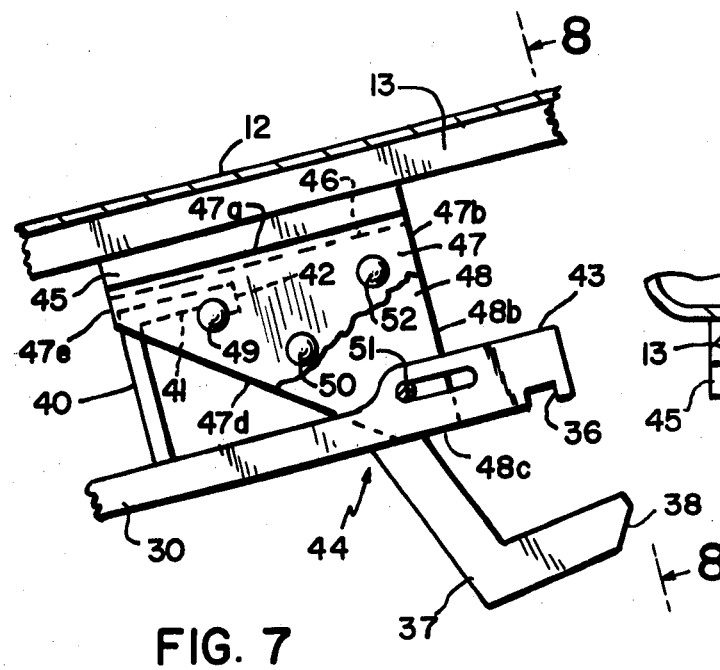
FIG. 7 is a fragmentary, greatly enlarged side elevational view, partly broken away and partly in section, showing another embodiment of auxiliary wheel assembly.
Figure 8:
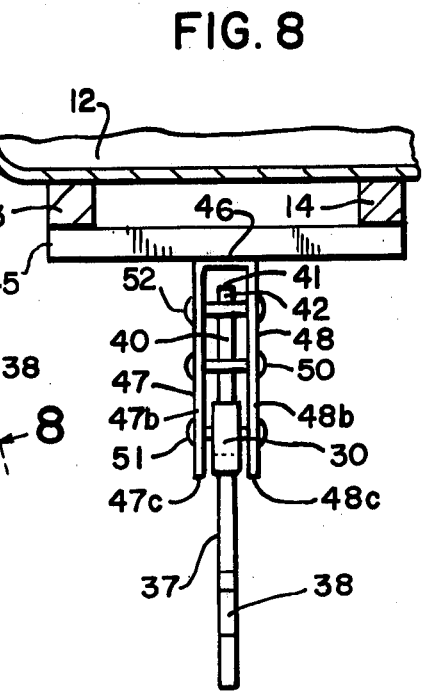
FIG. 8 is a fragmentary, rear elevational view taken on the line 8—8 of FIG. 7, looking in the direction of the arrows.

There is shown in FIGS. 7-8 another embodiment of auxiliary wheel assembly 44 of the subject invention. Specifically, cross member 45 of desired width and composition is secured laterally to selected portions of the bottom of the respective handles 13, 14 of a wheelbarrow. Assembly 44, fixedly secured to the bottom of said cross member and extending along the medial, longitudinal axis thereof, is generally of U-shaped, downwardly opening configuration consisting of base 46 and laterally spaced, pentagonally shaped plates 47-48. Plate 47 is bounded by upper edge 47a, rear edge 47b perpendicular thereto, relatively short bottom edge 47c, angularly inclined lower front edge 47d, and upper front edge 47e parallel to edge 47b; plate 48 is of similar shape and size.

Horizontally extending rods 49-52 are secured laterally to selected portions of plates 47, 48 respectively. Rods 49-51 lie in the same approximate rearwardly declining plane generally paralleling front edge 47d and said rods are approximately equidistantly spaced; rod 52 is positioned in relative close proximity to the rear edge of base 46 and is essentially horizontally aligned with rod 49 and vertically aligned with rod 51. Arm 30, heretofore described in detail, passes rearwardly between plates 47, 48 in a relatively close fit and is pivotally mounted on rod 51; said auxiliary wheel assembly 44 operates in the manner heretofore described in detail in connection with FIGS. 1-6.

In a modification of the embodiment of FIGS. 7-8, rod 49 is removed and a medial, longitudinally extending and downwardly depending bracket is secured to the bottom of base 46 in proximity to the foremost end thereof to receive section 41 of bracket 39 and maintain the arm in out of operative position.

It should be understood, of course, that the foregoing disclosure relates to only preferred embodiments of the invention and that it is intended to cover all changes and modifications of the invention herein chosen for the purposes of the disclosure which do not constitute departures from the spirit and scope of the invention.

What is claimed is:

1. An auxiliary wheel assembly adapted to be mounted on a wheelbarrow including a pan, forwardly converging handles secured to said pan, a forward wheel rotatably mounted intermediate said handles, and legs supporting said pan, said assembly comprising first and second outer plates adapted to be secured to selected portions of said handles,
   first and second transversely extending and longitudinally spaced bars secured to selected portions of said handles,
   first and second inner plates equidistantly spaced laterally of the longitudinal axis of said wheelbarrow and intermediate said first and second outer plates,
   said inner plates secured to selected portions of said second bar,
   at least first, second and third transversely extending rods passing through selected portions of said inner plates and secured laterally to said outer plates,
   an elongated, longitudinally extending arm pivotally mounted intermediate said inner plates on said second rod,
   an auxiliary wheel rotatably mounted on said arm,
   a shaped member secured in proximity to the rearmost end of said arm,
   said arm adapted to pivot rearwardly until stopped by bearing against said first rod whereby said arm extends angularly upwardly between said first and third rods and said auxiliary wheel additionally supports said wheelbarrow.

2. The invention of claim 1 wherein said shaped member bears against said pan and additionally supports said arm in operative position.

3. The invention of claim 1 further including means on said arm in proximity to said auxiliary wheel to secure said wheel in out of operative position.

4. The invention of claim 1 wherein said arm includes means adapted to engage said third rod whereby said arm is secured in elevated, inclined condition.

5. The invention of claim 1 wherein said first and second bars are secured laterally to said first and second outer plates.

6. The invention of claim 1 further including bracket means secured to said first bar adapted to secure said auxiliary wheel in out of operative position.

7. The invention of claim 1 further including a fourth, transversely extending rod secured intermediate said first and second outer plates and adapted to coact with means on said arm to secure said auxiliary wheel in out of operative position.

8. An auxiliary wheel assembly adapted to be mounted on a wheelbarrow including a pan, forwardly converging handles secured to said pan, a forward wheel rotatably mounted intermediate said handles, and legs supporting said pan, said assembly comprising a transversely extending member adapted to be secured to selected portions of said handles,
   a downwardly depending, U-shaped bracket secured medially to said member,
   said bracket consisting of a base and longitudinally extending and laterally spaced first and second plates,
   at least first, second and third transversely extending rods secured laterally to said first and second plates,
   an elongated, longitudinally extending arm pivotally mounted intermediate said first and second plates on said second rod,
   an auxiliary wheel rotatably mounted on said arm,
   a shaped member secured in proximity to the rearmost end of said arm,
   said arm adapted to pivot rearwardly until stopped by bearing against said first rod whereby said arm extends angularly upwardly between said first and third rods and said auxiliary wheel additionally supports said wheelbarrow.

9. The invention of claim 8 wherein said shaped member bears against said pan and additionally supports said arm in operating position.

10. The invention of claim 8 further including a bracket secured to said base and adapted to coact with means on said leg rearwardly of said auxiliary wheel to secure said auxiliary wheel in out of operative position.

11. The invention of claim 8 further including a fourth rod adapted to be secured laterally to said first and second plates and adapted to coact with means on said leg rearwardly of said auxiliary wheel to secure said auxiliary wheel in out of operative position.

* * * * *